US012761522B2

(12) United States Patent
Park et al.

(10) Patent No.: US 12,761,522 B2
(45) Date of Patent: Oct. 13, 2026

(54) MACH-ZEHNDER OPTICAL MODULATOR INCLUDING MULTI-MODE INTERFERER

(71) Applicant: ELECTRONICS AND TELECOMMUNICATIONS RESEARCH INSTITUTE, Daejeon (KR)

(72) Inventors: Jaegyu Park, Daejeon (KR); Sungil Kim, Daejeon (KR); Kisoo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 305 days.

(21) Appl. No.: 18/412,930

(22) Filed: Jan. 15, 2024

(65) Prior Publication Data

US 2024/0353728 A1 Oct. 24, 2024

(30) Foreign Application Priority Data

Apr. 20, 2023 (KR) ........................ 10-2023-0051882

(51) Int. Cl.
*G02F 1/21* (2006.01)

(52) U.S. Cl.
CPC .................................... *G02F 1/212* (2021.01)

(58) Field of Classification Search
CPC ..... G02F 1/212; G02F 1/225; G02B 6/12011; G02B 6/12016; G02B 2006/1209; G02B 2006/12107; G02B 2006/12159
See application file for complete search history.

(56) References Cited

U.S. PATENT DOCUMENTS

| | | | | |
|---|---|---|---|---|
| 5,315,422 A * | 5/1994 | Utaka | G02F 1/3517 385/5 |
| 8,078,015 B2 * | 12/2011 | Sugiyama | G02F 1/2255 385/14 |
| 9,851,615 B2 | 12/2017 | Jewart et al. | |
| 11,275,287 B2 * | 3/2022 | Ogiso | G02B 6/12 |
| 11,341,992 B1 | 5/2022 | Jain et al. | |
| 2003/0165001 A1 | 9/2003 | Uesaka | |

(Continued)

FOREIGN PATENT DOCUMENTS

KR 10-2016-0113482 A 9/2016

OTHER PUBLICATIONS

US 11,411,652 B2, 08/2022, Xu et al. (withdrawn)

(Continued)

*Primary Examiner* — Bumsuk Won
*Assistant Examiner* — John C Sipes

(57) ABSTRACT

Provided is a Mach-Zehnder optical modulator. The optical modulator thereof includes an input waveguide on one side of a substrate, an output waveguide on the other side of the substrate, an optical power splitter between the input waveguide and the output waveguide, an optical power combiner between the optical power splitter and the output waveguide, branch waveguides between the optical power splitter and the optical power combiner, and electrodes provided on the outer periphery of the branch waveguides and between the branch waveguides, and multi-mode interferers provided between the electrodes, and connected in series to the branch waveguides.

16 Claims, 8 Drawing Sheets

(56) References Cited

U.S. PATENT DOCUMENTS

| | | | | |
|---|---|---|---|---|
| 2011/0194802 | A1* | 8/2011 | Sugiyama | G02F 1/0356 385/3 |
| 2012/0027336 | A1 | 2/2012 | Park et al. | |
| 2014/0294401 | A1 | 10/2014 | Chung et al. | |
| 2020/0099454 | A1* | 3/2020 | Talkhooncheh | G02F 1/225 |
| 2021/0175276 | A1* | 6/2021 | Ives | G02B 6/136 |
| 2022/0236618 | A1 | 7/2022 | Han et al. | |
| 2023/0221612 | A1* | 7/2023 | Takabayashi | G02F 1/0123 385/3 |
| 2023/0296927 | A1* | 9/2023 | Sugiyama | G02F 1/0147 359/288 |

OTHER PUBLICATIONS

Inoue et al. “Silicon Optical . . . based on multimode interference waveguide” (Year: 2019).*

Zong Wang et al., “Silicon-Lithium Niobate Hybrid Intensity and Coherent Modulators Using a Periodic Capacitively Loaded Traveling-Wave Electrode,” ACS Photonics, 2022, pp. 2668-2675, vol. 9.

Daisuke Inoue et al., “Silicon Optical Modulator Using a Low-Loss Phase Shifter Based on a Multimode Interference Waveguide,” Micromachines, 2019, vol. 10, 482; doi: 10.3390/mi10070482.

* cited by examiner

MACH-ZEHNDER OPTICAL MODULATOR INCLUDING MULTI-MODE INTERFERER

CROSS-REFERENCE TO RELATED APPLICATIONS

This U.S. non-provisional patent application claims priority under 35 U.S.C. § 119 of Korean Patent Application No. 10-2023-0051882, filed on Apr. 20, 2023, the entire contents of which are hereby incorporated by reference.

BACKGROUND

The present disclosure herein relates to a Mach-Zehnder optical modulator, and more particularly to, a Mach-Zehnder optical modulator including a multi-mode interferer.

The next-generation 6G communication requires the development of photonics integrated circuits (PICs) capable of highly-integrated, low-power, and ultra-high-speed data processing. In such a technical trend, a microwave photonics technology, which converts a sub-terahertz (sub-THz) signal into an optical signal without delay, is one of essential key techniques. The techniques for implementing the technology is an ultra-high-speed optical modulator technology that serves to convert data (an electrical signal) into an optical signal. Recently, research results have been published on data transmission up to about 60 GHz in single Si- and InP-based optical modulator chip, and up to 100 GHz or greater in an $LiNbO_3$-on-insulator (LNOI)-based optical modulator chip. However, in order to convert a sub-THz wireless signal without delay, an ultra-high-speed, low-power optical modulator is required.

SUMMARY

The present disclosure provides a Mach-Zehnder optical modulator capable of overcoming the frequency limit according to the distance between the electrodes.

An embodiment of the inventive concept provides a Mach-Zehnder optical modulator. The optical modulator includes an input waveguide provided on one side of a substrate, an output waveguide provided on the other side of the substrate, an optical power splitter provided between the input waveguide and the output waveguide, an optical power combiner provided between the optical power splitter and the output waveguide, branch waveguides connected between the optical power splitter and the optical, electrodes provided on the outer periphery of the branch waveguides and between the branch waveguides, and multi-mode interferers provided between the electrodes, and connected in series to the branch waveguides.

In an embodiment, the multi-mode interferers may have a width greater than a width of the branch waveguides.

In an embodiment, the electrodes may be extended onto the multi-mode interferers.

In an embodiment, the electrodes may have a separation distance less than the width of the multi-mode interferers.

In an embodiment, the separation distance between the electrodes may be greater than the width of the branch waveguides.

In an embodiment, the separation distance between the electrodes may be 2 μm to 9 μm.

In an embodiment, gratings may be further included between the multi-mode interferers and the electrodes.

In an embodiment, the gratings may include a first grating provided on one side of the multi-mode interferers, and a second grating provided on the other side of the multi-mode interferers.

In an embodiment, auxiliary waveguides may be further included between the gratings and the electrodes.

In an embodiment, the gratings may be provided on both sides of the multi-mode interferers and on both sides of the branch waveguides between the multi-mode interferers.

In an embodiment of the inventive concept, a Mach-Zehnder optical modulator includes a substrate, a slab waveguide layer on the substrate, and a rib waveguide layer on the slab waveguide layer. Here, the rib waveguide layer includes an input waveguide provided on one side of the substrate, an output waveguide provided on the other side of the substrate, an optical power splitter provided between the input waveguide and the output waveguide, an optical power combiner provided between the optical power splitter and the output waveguide, branch waveguides connected between the optical power splitter and the optical power combiner, and multi-mode interferers connected in series to the branch waveguides.

In an embodiment, electrodes may be further included between the branch waveguides.

In an embodiment, the electrodes may include a first external electrode provided on one side of the branch waveguides, a second external electrode provided on the other side of the branch waveguides, and an internal electrode provided between the branch waveguides.

In an embodiment, the first external electrode, the second external electrode, and the internal electrode may each be provided on the multi-mode interferers.

In an embodiment, the multi-mode interferers may have a width greater than a distance between the first external electrode and the internal electrode and a distance between the second external electrode and the internal electrode.

In an embodiment, the rib waveguide may further include gratings between the multi-mode interferers and the electrodes.

In an embodiment, the gratings may include a first grating provided on one side of the multi-mode interferers, and a second grating provided on the other side of the multi-mode interferers.

In an embodiment, the lip waveguide may further include auxiliary waveguides between the gratings and the electrodes.

In an embodiment, the auxiliary waveguides may include a first auxiliary waveguide adjacent to the first grating, and a second auxiliary waveguide adjacent to the second grating.

In an embodiment, the gratings may be provided on both sides of the multi-mode interferers and on both sides of the branch waveguides between the multi-mode interferers.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
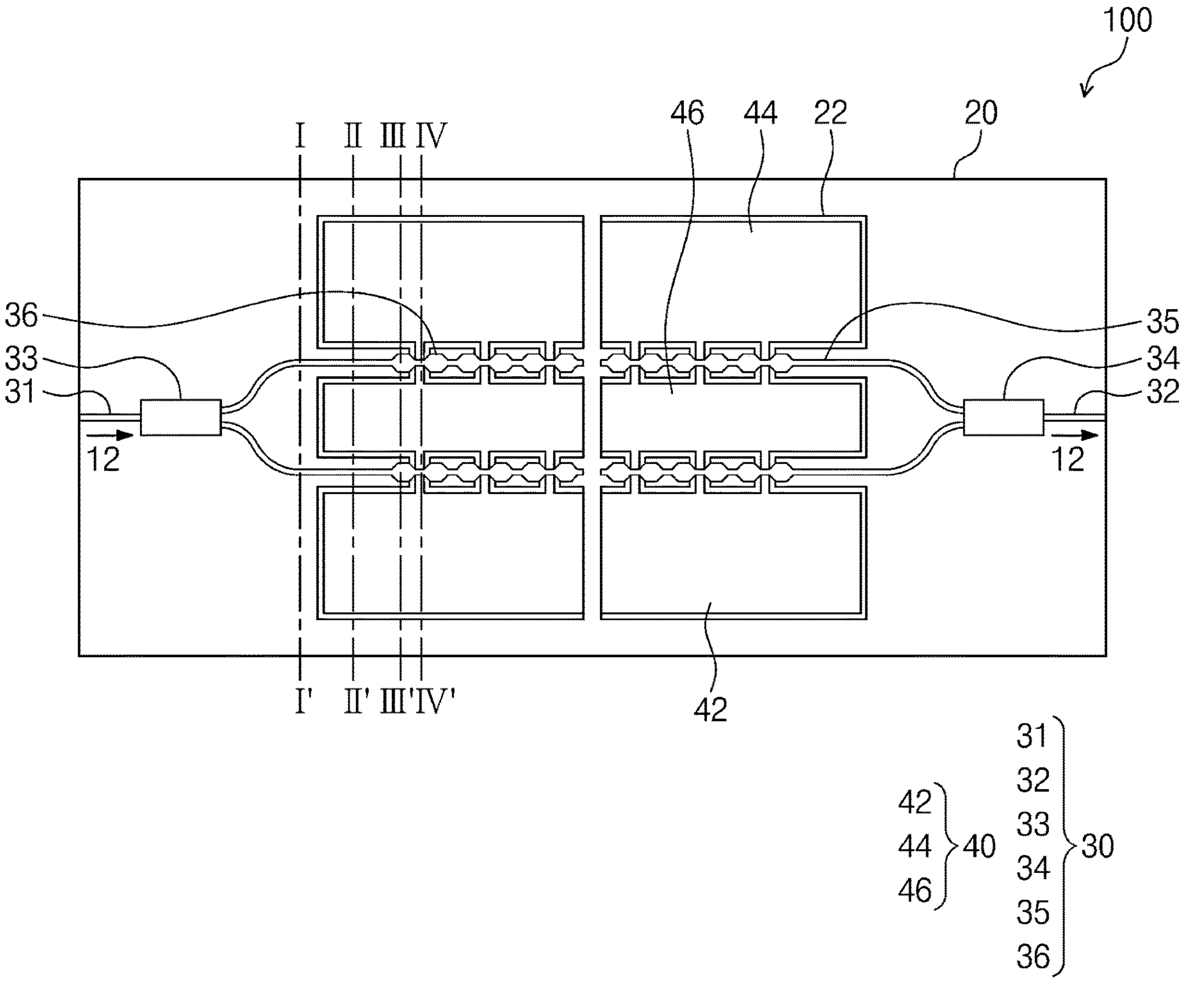
FIG. 1 is a plan view showing an example of a Mach-Zehnder optical modulator according to an embodiment of the inventive concept.
Figure 2:
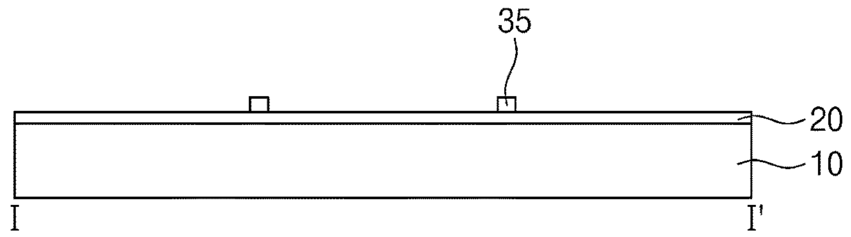
FIGS. 2, 3, 4, and 5 are cross-sectional views taken along I-I', II-II', and III-III' of FIG. 1.
Figure 3:
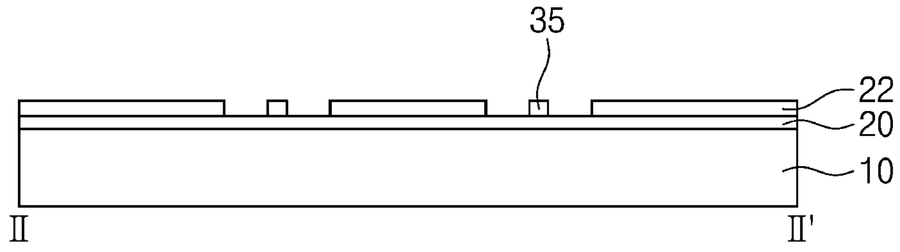
Figure 4:
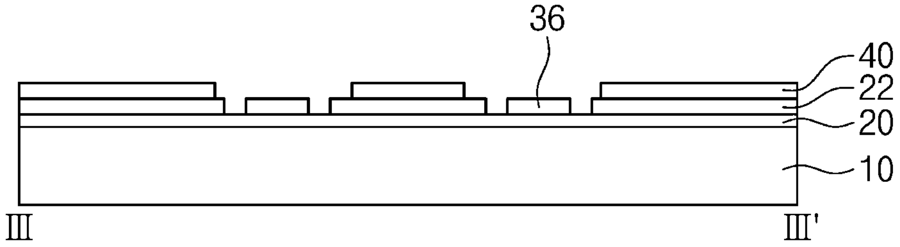
Figure 5:
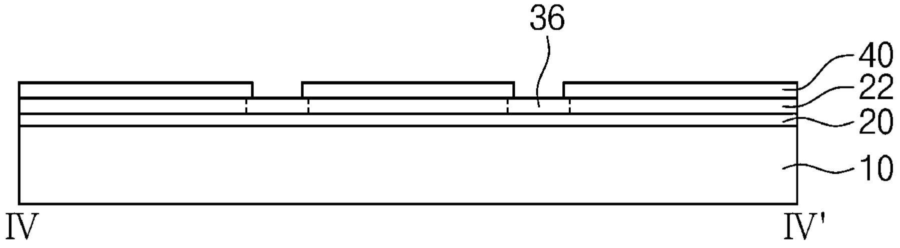

Hereinafter, preferred embodiments of the present invention will be described in detail with reference to the accompanying drawings. Advantages and features of the inventive concept and methods of accomplishing the same may be understood more readily by reference to the following detailed description of embodiments and the accompanying drawings. However, the inventive concept is not limited to the embodiments described herein, and may be embodied in other forms. Rather, the embodiments introduced herein are provided to ensure that the disclosed contents may be thorough and complete, and that the spirit of the inventive concept may be sufficiently conveyed to those skilled in the art, and the inventive concept is only defined by the scope of claims. The same reference numerals refer to like elements throughout the specification.

The terms used herein are for the purpose of describing embodiments and are not intended to be limiting of the present invention. In the present disclosure, singular forms include plural forms unless the context clearly indicates otherwise. As used herein, the terms "comprises" and/or "comprising" are intended to be inclusive of the stated elements, operations and/or devices, and do not exclude the possibility of the presence or the addition of one or more other elements, operations, and/or devices. In addition, since the present specification is according to a preferred embodiment, reference numerals presented according to the order of description are not necessarily limited to the order.

In addition, embodiments described in the present specification will be described with reference to cross-sectional views and/or plan views which are ideal illustrations of the inventive concept. In the drawings, the thickness of films and regions are exaggerated for an effective description of technical contents. Accordingly, the shape of an example may be modified by manufacturing techniques and/or tolerances. Thus, the embodiments of the inventive concept are not limited to specific forms shown, but are intended to include changes in the form generated by a manufacturing process. Thus, the regions illustrated in the drawings have properties, and the shapes of the regions illustrated in the drawings are intended to exemplify specific shapes of regions of a device and are not intended to limit the scope of the inventive concept.

FIG. 1 shows an example of a Mach-Zehnder optical modulator 100 according to an embodiment of the inventive concept. FIG. 2 to FIG. 5 are views taken along I-I', II-II', and III-III' of FIG. 1.

Referring to FIG. 1 to FIG. 5, the Mach-Zehnder optical modulator 100 of the inventive concept may include a substrate 10, a slab waveguide layer 20, a rib waveguide layer 30, and electrodes 40.

The substrate 10 may include an SOI substrate. Alternatively, the substrate 10 may contain silicon, but the embodiment of the inventive concept is not limited thereto.

The slab waveguide layer 20 may be provided on the substrate 10. The slab waveguide layer 20 may contain LiiNbO3. Alternatively, the slab waveguide layer 20 may contain silicon nitride, but the embodiment of the inventive concept is not limited thereto.

The rib waveguide layer 30 may be provided on the slab waveguide layer 20. The rib waveguide layer 30 may include a material which is the same as the material of the slab waveguide layer 20. For example, the rib waveguide layer 30 may contain LiNbO3. The rib waveguide layer 30 may transmit and modulate light 12. According to an example, the rib waveguide layer 30 may include an input waveguide 31, an output waveguide 32, an optical power splitter 33, an optical power combiner 34, branch waveguides 35, and multi-mode interferers 36.

The input waveguide 31 may be provided on one side of the substrate 10. The input waveguide 31 may receive the light 12.

The output waveguide 32 may be provided on the other side of the substrate 10. The output waveguide 32 may output the light 12 to the outside. The light 12 may be modulated light.

The optical power splitter 33 may be connected to the input waveguide 31. The optical power splitter 33 may receive the light 12 and transmit the light 12 to the branch waveguides 35. The optical power splitter 33 may include a 50:50 optical power splitter.

The optical power combiner 34 may be connected between the branch waveguides 35 and the output waveguide 32. The optical power combiner 34 may transmit the light 12 of the branch waveguides 35 to the output waveguide 32. The light 12 in the optical power combiner 34 may be modulated according to a phase difference.

The branch waveguides 35 may be connected between the optical power splitter 33 and the optical power combiner 34. The branch waveguides 35 may be branched from the optical power splitter 33 and connected to the optical power combiner 34. The light 12 in the branch waveguides 35 may have a phase regulated based on an electric field induced between the electrodes 40. The light 12 may be modulated by destructive interference or constructive interference caused by the phase difference thereof in the optical power combiner 34.

The multi-mode interferers 36 may be connected in series to each of the branch waveguides 35. The multi-mode interferers 36 may be connected between the electrodes 40. The multi-mode interferers 36 may have a width greater than the width of the branch waveguides 35. For example, each of the multi-mode interferers 36 may include a 1×1 multi-mode interference coupler.

The electrodes 40 may be provided on the outer periphery and between the branch waveguides 35. The electrodes 40 may be provided on both sides of the multi-mode interferers 36. The electrodes 40 may be modulating electrodes. The electrodes 40 may use a modulation signal to adjust the phase of the light 12 in the multi-mode interferers 36. According to an example, the electrodes 40 may include a first external electrode 42, a second external electrode 44, and an internal electrode 46. The first external electrode 42 may be provided on the outer periphery of one of the branch waveguides 35. The second external electrode 44 may be provided on the outer periphery of another one of the branch waveguides 35. The internal electrode 46 may be provided between the branch waveguides 35.

A clad layer 22 may be provided between the electrodes 40 and the slab waveguide layer 20. The clad layer 22 may have an upper surface which is coplanar with an upper surface of the multi-mode interferer 36. The electrodes 40 may be extended from the clad layer 22 to the multi-mode interferer 36 without a step.

Figure 6:
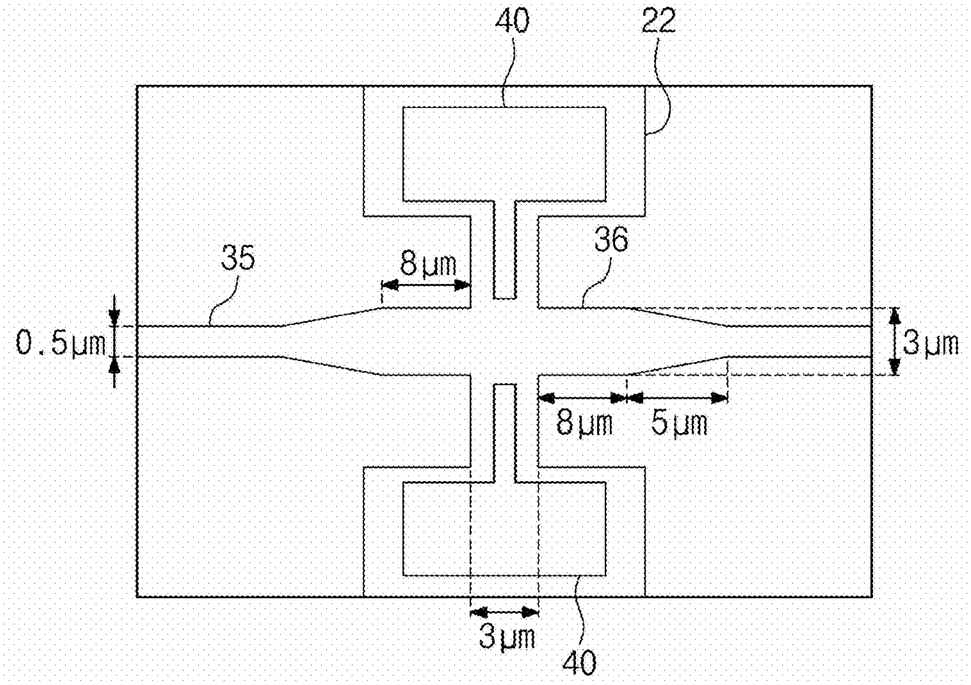
FIG. 6 is a plan view showing an example of a multi-mode interferer and electrodes of FIG. 1.
Figure 7:
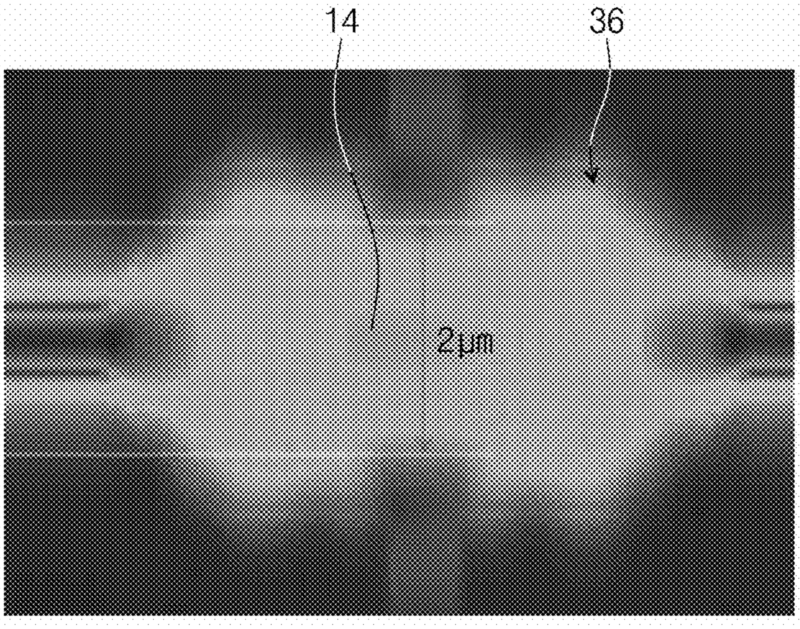
FIG. 7 is a simulation diagram showing an optical signal in the multi-mode interferer of FIG. 6.

FIG. 6 shows an example of the multi-mode interferer 36 and the electrodes 40 of FIG. 1. FIG. 7 shows an optical signal 14 in the multi-mode interferer 36 of FIG. 6.

Referring to FIG. 6 and FIG. 7, the optical signal 14 may be concentrated in the multi-mode interferer 36 by multi-mode interference of the light 12. The electrodes 40 may have a distance equal to the width of the multi-mode interferer 36. The multi-mode interferer 36 may have a length of about 19 μm and a width of about 3 μm. The multi-mode interferer 36 may be tapered adjacent to the branch waveguide 35. The tapered distance of the multi-mode interferer 36 may be about 5 μm. The branch waveguides 35 may have a width of about 0.5μ. The electrodes 40 may have a separation distance equal to the width of the multi-mode interferer 36. The separation distance of the electrodes 40 may be about 3 μm.

Figure 8:
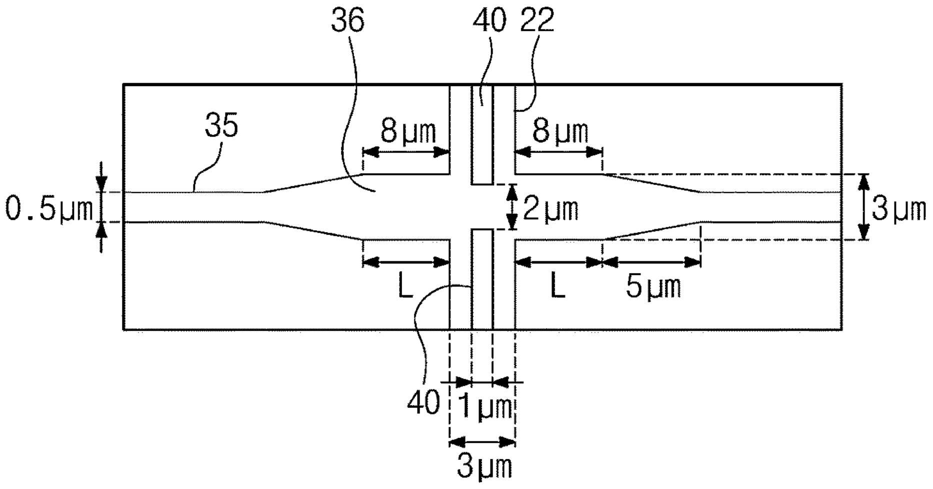
FIG. 8 shows an example of the multi-mode interferer and the electrodes of FIG. 1.

FIG. 8 shows an example of the multi-mode interferer 36 and the electrodes 40 of FIG. 1.

Figure 9:
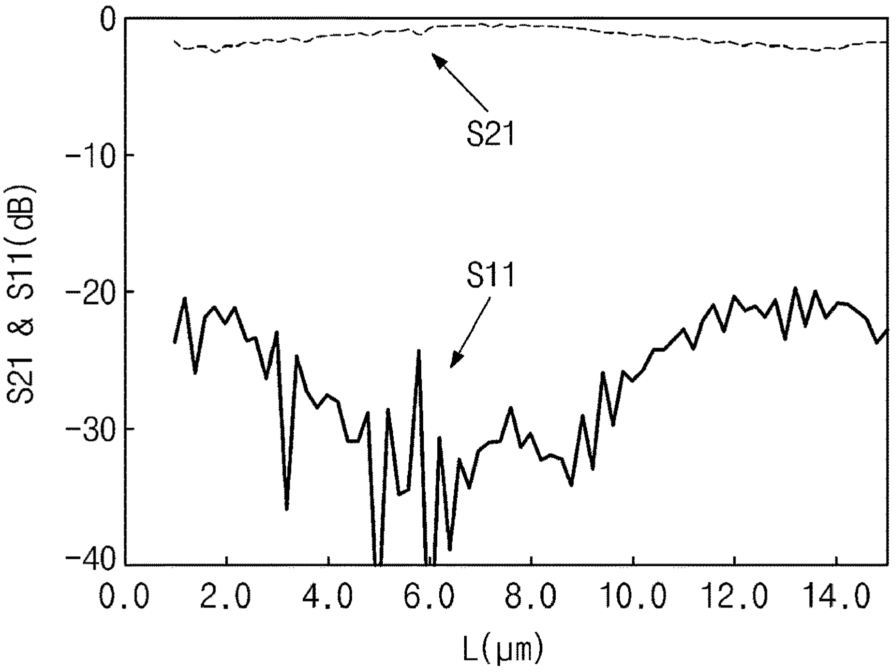
FIG. 9 is a graph showing transmission and reflection of light according to the half length L of the multi-mode interferer of FIG. 1.
Figure 10:
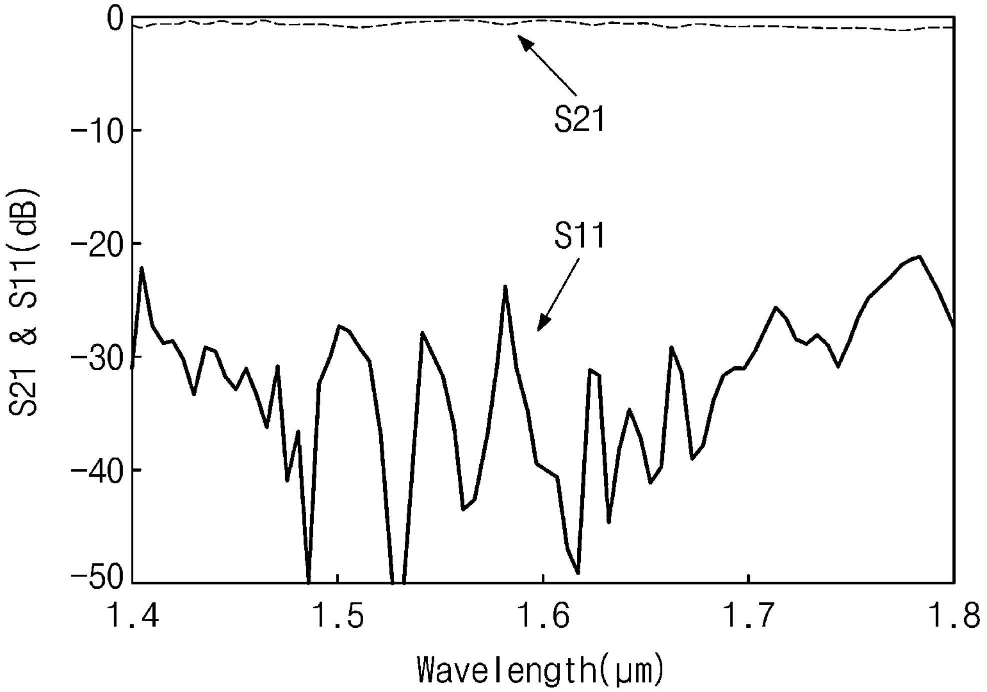
FIG. 10 is a graph showing transmission and reflection according to the wavelength of light of FIG. 1.

FIG. 9 shows transmission S21 and reflection S11 of the light 12 according to the half length L of the multi-mode interferer 36 of FIG. 1. FIG. 10 shows the transmission S21 and the reflection S11 according to the wavelength of the light 12 of FIG. 1.

Referring to FIG. 8 to FIG. 10, the electrodes 40 may have a separation distance smaller than the width of the multi-mode interferer 36. The separation distance of the electrodes 40 may be about 2 μm, and the width of the multi-mode interferer 36 may be about 3 μm. The electrodes 40 may be provided on the multi-mode interferer 36. When the separation distance between the electrodes 40 decreases, the intensity of an electric field provided to the multi-mode interferer 36 by the electrodes 40 may increase. When the half length L of the multi-mode interferer 36 may be greater than the separation distance of the electrodes 40, the intensity of an electric field may increase.

Referring to FIG. 9, when the half length L of the multi-mode interferer 36 is about 2 μm to about 9 μm, the reflection S11 of the light 12 in the multi-mode interferer 36 may be minimized. The transmission S21 of the light 12 in the multi-mode interferer 36 may be decreased.

Referring to FIG. 10, when the light 12 has a wavelength of about 1.48 μm to about 1.67 μm, the reflection S11 of the light 12 in the multi-mode interferer 36 may be minimized. The transmission S21 of loss of the light 12 in the multi-mode interferer 36 may be minimal.

Therefore, the Mach-Zehnder optical modulator 100 of the inventive concept may use the multi-mode interferers 36 connected to the branch waveguides 35 between the electrodes 40 to overcome the frequency limit according to the distance between the electrodes 40.

Figure 11:
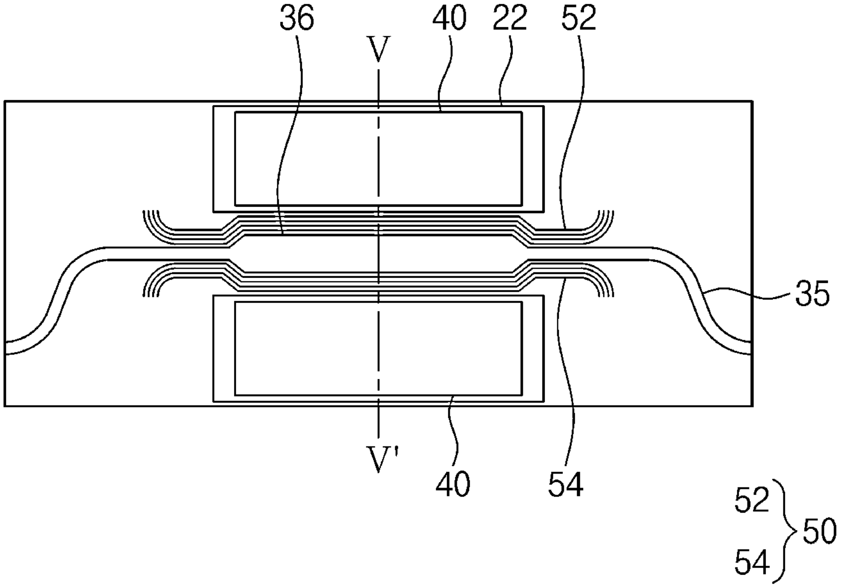
FIG. 11 is a plan view showing an example of the multi-mode interferer and the electrodes of FIG. 1.
Figure 12:
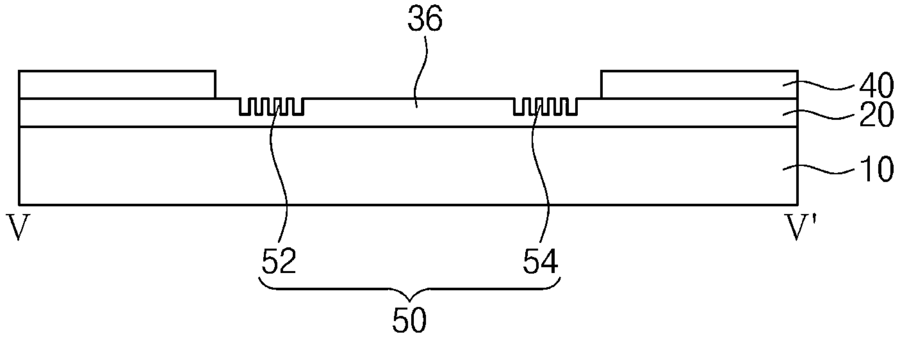
FIG. 12 is a cross-sectional view taken along line V-V' of FIG. 11.

FIG. 11 shows an example of the multi-mode interferer 36 and the electrodes 40 of FIG. 1. FIG. 12 is a view taken along line V-V' of FIG. 11.

Referring FIG. 11 and FIG. 12, gratings 50 may be provided between the electrodes 40 and the multi-mode interferer 36. The gratings 50 may be sub-wavelength gratings having a distance smaller than the wavelength of the light 12. The gratings 50 may have a width smaller than the width of the multi-mode interferer 36. The gratings 50 may have a width of about 1 μm or less. The gratings 50 may reduce light spread on the outer periphery of the multi-mode interferer 36. According to an example, the gratings 50 may include a first grating 52 and a second grating 54. The first grating 52 and the second grating 54 may be provided on both sides of the multi-mode interferer 36.

Figure 13:
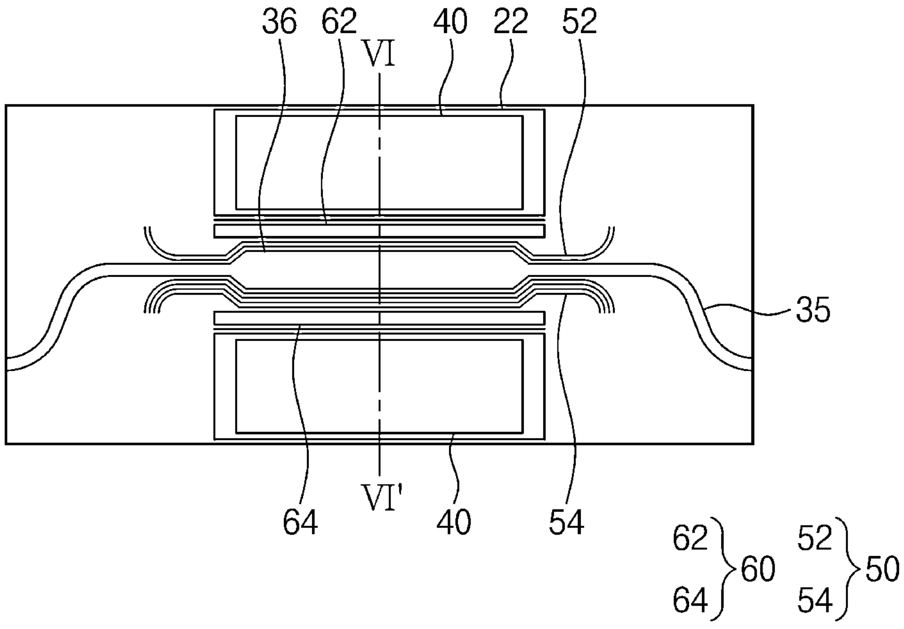
FIG. 13 is a plan view showing an example of gratings and the multi-mode interferer of FIG. 11.
Figure 14:
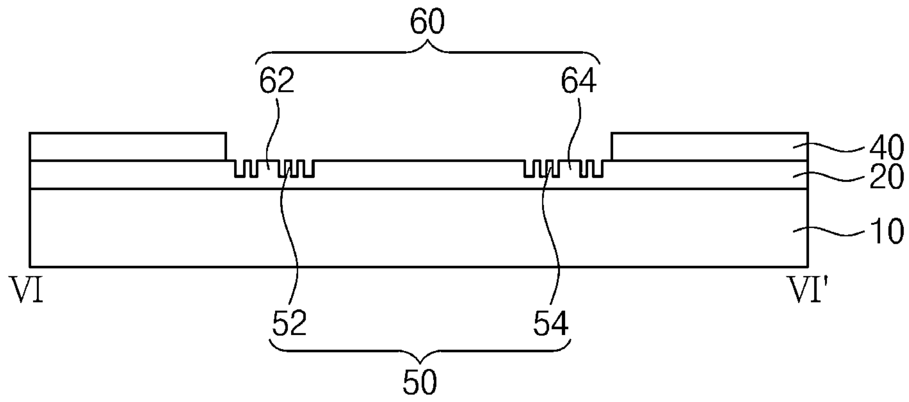
FIG. 14 is a cross-sectional view taken along line VI-VI' of FIG. 13.

FIG. 13 shows an example of the gratings 50 and the multi-mode interferer 36 of FIG. 11. FIG. 14 is a view taken along line VI-VI' of FIG. 13.

Referring FIG. 13 and FIG. 14, auxiliary waveguides 60 may be provided between the gratings 50 and the electrodes 40. The auxiliary waveguides 60 may be provided on both sides of the gratings 50. Each of the auxiliary waveguides 60 may have a width equal to the width of the branch waveguides 35. Each of the auxiliary waveguides 60 may have a width of about 0.5 μm. The auxiliary waveguides 60 may eliminate or minimize light spread. According to an example, the auxiliary waveguides 60 may include first auxiliary waveguide 62 and second auxiliary waveguide 64. The first auxiliary waveguide 62 may be provided adjacent to the first grating 52. The second auxiliary waveguide 64 may be provided adjacent to the second grating 54.

Figure 15:
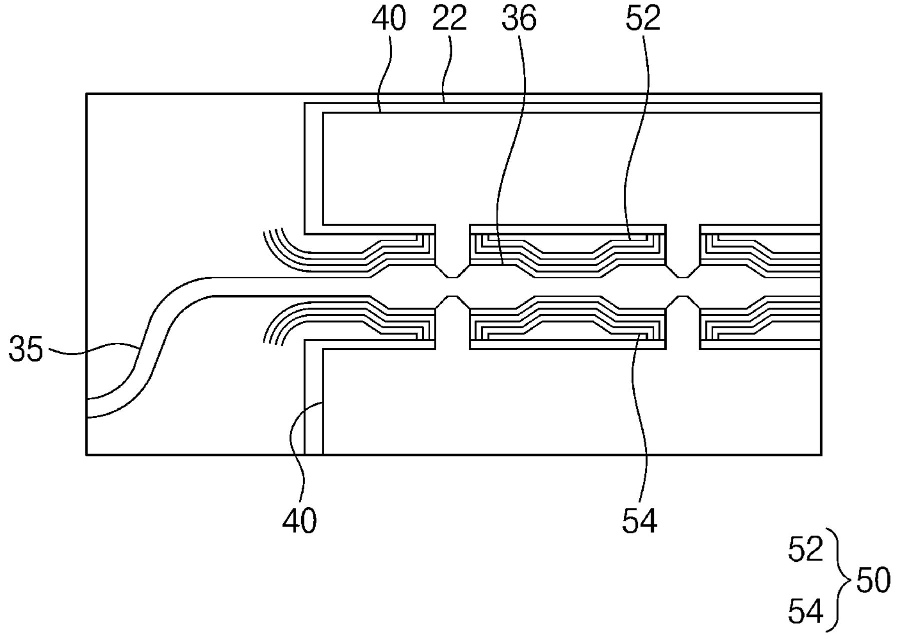
FIG. 15 is a plan view showing an example of gratings of FIG. 11.

FIG. 15 shows an example of the gratings 50 of FIG. 11.

Referring to FIG. 15, the gratings 50 may be provided to both sides of the multi-mode interferers 36, and to both sides of the branch waveguides 35 between the multi-mode interferers 36. The gratings 50 may reduce light spread on the outer periphery of the multi-mode interferers 36 and the branch waveguides 35. In addition, the gratings 50 may reduce the separation distance of the electrodes 40, and increase the intensity of the electric field between the electrodes 40.

As described above, a Mach-Zehnder optical modulator according to an embodiment of the inventive concept may use multi-mode interferers connected to branch waveguides between electrodes to overcome the frequency limit according to the distance between the electrodes.

Although the embodiments of the present invention have been described with reference to the accompanying drawing, those skilled in the art will understand that the present invention can be implemented in other specific forms without changing the technical spirit or essential features thereof. Therefore, the embodiments described above should be understood as illustrative in all respects and not restrictive.

What is claimed is:

1. A Mach-Zehnder optical modulator comprising:

an input waveguide provided on one side of a substrate;

an output waveguide provided on the other side of the substrate;

an optical power splitter provided between the input waveguide and the output waveguide;

an optical power combiner provided between the optical power splitter and the output waveguide;

branch waveguides connected between the optical power splitter and the optical power combiner;

multi-mode interferers connected in series to the branch waveguides;

electrodes provided on the outer periphery of the branch waveguides and between the branch waveguides;

gratings provided between the multi-mode interferers and the electrodes; and auxiliary waveguides provided between the gratings and the electrodes, wherein the electrodes have a separation distance less than a width of the multi-mode interferers.

2. The Mach-Zehnder optical modulator of claim 1, wherein the multi-mode interferers have a width greater than a width of the branch waveguides.

3. The Mach-Zehnder optical modulator of claim 2, wherein the electrodes are extended onto the multi-mode interferers.

4. The Mach-Zehnder optical modulator of claim 1, wherein the separation distance between the electrodes is greater than the width of the branch waveguides.

5. The Mach-Zehnder optical modulator of claim 1, wherein the separation distance between the electrodes is 2 μm to 9 μm.

6. The Mach-Zehnder optical modulator of claim 1, wherein the gratings comprise:

a first grating provided on one side of the multi-mode interferers; and a second grating provided on the other side of the multi-mode interferers.

7. The Mach-Zehnder optical modulator of claim 6, wherein the auxiliary waveguides comprise:

a first auxiliary waveguide adjacent to the first grating; and a second auxiliary waveguide adjacent to the second grating.

8. The Mach-Zehnder optical modulator of claim 1, wherein the gratings are provided on both sides of the multi-mode interferers and on both sides of the branch waveguides between the multi-mode interferers.

9. A Mach-Zehnder optical modulator comprising:

a substrate;

a slab waveguide layer on the substrate; and a rib waveguide layer on the slab waveguide layer, wherein the rib waveguide layer includes:

an input waveguide provided on one side of the substrate;

an output waveguide provided on the other side of the substrate;

an optical power splitter provided between the input waveguide and the output waveguide;

an optical power combiner provided between the optical power splitter and the output waveguide;

branch waveguides connected between the optical power splitter and the optical power combiner;

multi-mode interferers connected in series to the branch waveguides;

electrodes provided between the branch waveguides;

gratings provided between the multi-mode interferers and the electrodes; and auxiliary waveguides provided between the gratings and the electrodes, wherein the multi-mode interferers have a width greater than a separation distance between the electrodes.

10. The Mach-Zehnder optical modulator of claim 9, wherein the electrodes comprise:

a first external electrode provided on one side of the branch waveguides;

a second external electrode provided on the other side of the branch waveguides; and an internal electrode provided between the branch waveguides.

11. The Mach-Zehnder optical modulator of claim 10, wherein the first external electrode, the second external electrode, and the internal electrode are each provided on the multi-mode interferers.

12. The Mach-Zehnder optical modulator of claim 10, wherein the multi-mode interferers have a width greater than a distance between the first external electrode and the internal electrode and a distance between the second external electrode and the internal electrode.

13. The Mach-Zehnder optical modulator of claim 9, wherein the separation distance between the electrodes is 2 μm to 9 μm.

14. The Mach-Zehnder optical modulator of claim 9, wherein the gratings comprise:

a first grating provided on one side of the multi-mode interferers; and a second grating provided on the other side of the multi-mode interferers.

15. The Mach-Zehnder optical modulator of claim 14, wherein the auxiliary waveguides comprise:

a first auxiliary waveguide adjacent to the first grating; and a second auxiliary waveguide adjacent to the second grating.

16. The Mach-Zehnder optical modulator of claim 9, wherein the gratings are provided on both sides of the multi-mode interferers and on both sides of the branch waveguides between the multi-mode interferers.

* * * * *